United States Patent [19]

Zscheile, Jr.

[11] 4,325,138
[45] Apr. 13, 1982

[54] CONTINUOUS WAVE ADAPTIVE SIGNAL PROCESSOR SYSTEM

[75] Inventor: John W. Zscheile, Jr., Murray, Utah

[73] Assignee: Sperry Corporation, New York, N.Y.

[21] Appl. No.: 191,871

[22] Filed: Sep. 29, 1980

[51] Int. Cl.³ .............................................. H04K 1/04
[52] U.S. Cl. .................................... 375/1; 343/5 PN; 375/37
[58] Field of Search ................. 375/1, 37; 370/24, 27, 370/28, 32; 343/5 PN, 10, 12 A, 13 R

[56] References Cited

U.S. PATENT DOCUMENTS

| | | | |
|---|---|---|---|
| 3,167,766 | 1/1965 | Norris | 343/12 A |
| 3,696,429 | 10/1972 | Tressa | 370/32 |
| 4,203,112 | 5/1980 | Wocher | 343/13 R |

OTHER PUBLICATIONS

Albaness and Klein, "Pseudorandom Code Waveform Design for CW Radar", Jan. 1979, pp. 67-75 IEEE Transactions on Aerospace and Electronic Systems.

*Primary Examiner*—Benedict V. Safourek
*Assistant Examiner*—Stephen Chin
*Attorney, Agent, or Firm*—John B. Sowell; Kenneth T. Grace; Marshall M. Truex

[57] ABSTRACT

A spread spectrum carrier wave device, such as an altimeter, is provided having a transmitting antenna in close proximity to the receiving antenna. The reference signals being transmitted are electromagnetically coupled into the receiving system as undesirable signals. When the strength of the undesirable signals becomes stronger than the desired signals, they mask the desired signals and make them difficult to recover. The undesirable signals are removed from the receiving path by generating a replica of the undesired signals and applying them to an input of an adaptive processor with the signals in the receiving path. After the undesired signals are removed by the process of adaptive nulling, the desirable signals are recovered and processed.

8 Claims, 1 Drawing Figure

CONTINUOUS WAVE ADAPTIVE SIGNAL PROCESSOR SYSTEM

BACKGROUND OF THE INVENTION

1. Field of the Invention

This invention relates to continuous wave adaptive signal processing systems and more particularly, relates to a spread spectrum carrier wave altimeter.

2. Description of the Prior Art

Radio frequency altimeters are known. The most common type of radio frequency altimeter transmits a burst of energy from a transmitting antenna and receives the reflected energy signal back at a receiving antenna. A ranging system is employed to determine the time required for the signal to make the round trip which is converted by known techniques into distance or elevation.

Continuous wave (CW) radio frequency altimeters are known, but heretofore have had limited use because the system is generally limited to a range of no more than ten thousand feet. The main reason that CW altimeters have limited use is that the signal produced at the transmitting antenna is coupled by leakage paths into the receiving antenna and the receiving signal processing path. When the leakage signal becomes much stronger than the desired signal, produced by reflection from a distant object, the leakage signal masks the desired signal and cannot be properly recovered. Ways have been suggested to extend the range of a CW altimeter but heretofore have been expensive and/or lacking in performance.

A radar altimeter is only one type of receiving and transmitting system which suffers from the above-mentioned leakage problem. Any continuous wave radio frequency communications system, which requires that the transmitting path be close to the receiving path will have replicas of the transmitted signal inherently coupled into the receiving path. Jamming systems, which generate jamming signals and also attempt to monitor the signal being jammed in order to measure the effectiveness of jamming, are plagued with the same problem when the receiving monitor system is placed in close proximity to the jamming transmitter.

A radio frequency altimeter, which generates bursts of energy, are easy to detect and are not suitable for use in a covert vehicle such as bombers and cruise missiles.

There is a need for an integral continuous wave transmitting and receiving system which is not affected by leakage signals. It would be desirable that such a system would be capable of use in a covert continuous wave radar altimeter as well as less sophisticated integral systems.

SUMMARY OF THE INVENTION

It is a principal object of the present invention to provide a novel radar altimeter.

It is another object of the present invention to provide a spread spectrum carrier wave radio frequency altimeter for covert applications.

It is yet another object of the present invention to provide a spread spectrum carrier wave apparatus having a transmitter system and a receiver system in close proximity in which the transmitted leakage signal is eliminated from the receiver system so as to enhance receptibility of a desired signal.

It is yet another object of the present invention to provide a novel receiving and transmitting system in which an adaptive processor is employed to eliminate undesired leakage signals leaving the desired received signals undisturbed.

According to these and other objects of the present invention, there is provided a spread spectrum carrier wave altimeter apparatus having a transmitter system in close proximity to a receiver system resulting in leakage signals being present in the receiving system. The signal path of the transmitting system is employed to process the signals to be transmitted as reference signals. The signal path of the receiving system is employed to process the leakage signals and the desired signals. The leakage signals present in the receiving path are employed to start a range count and the leakage signals are subsequently employed to cancel the reference signal leaving the desired signals. The desired signal is employed to stop the range count.

DESCRIPTION OF THE PREFERRED EMBODIMENT

Figure 1:
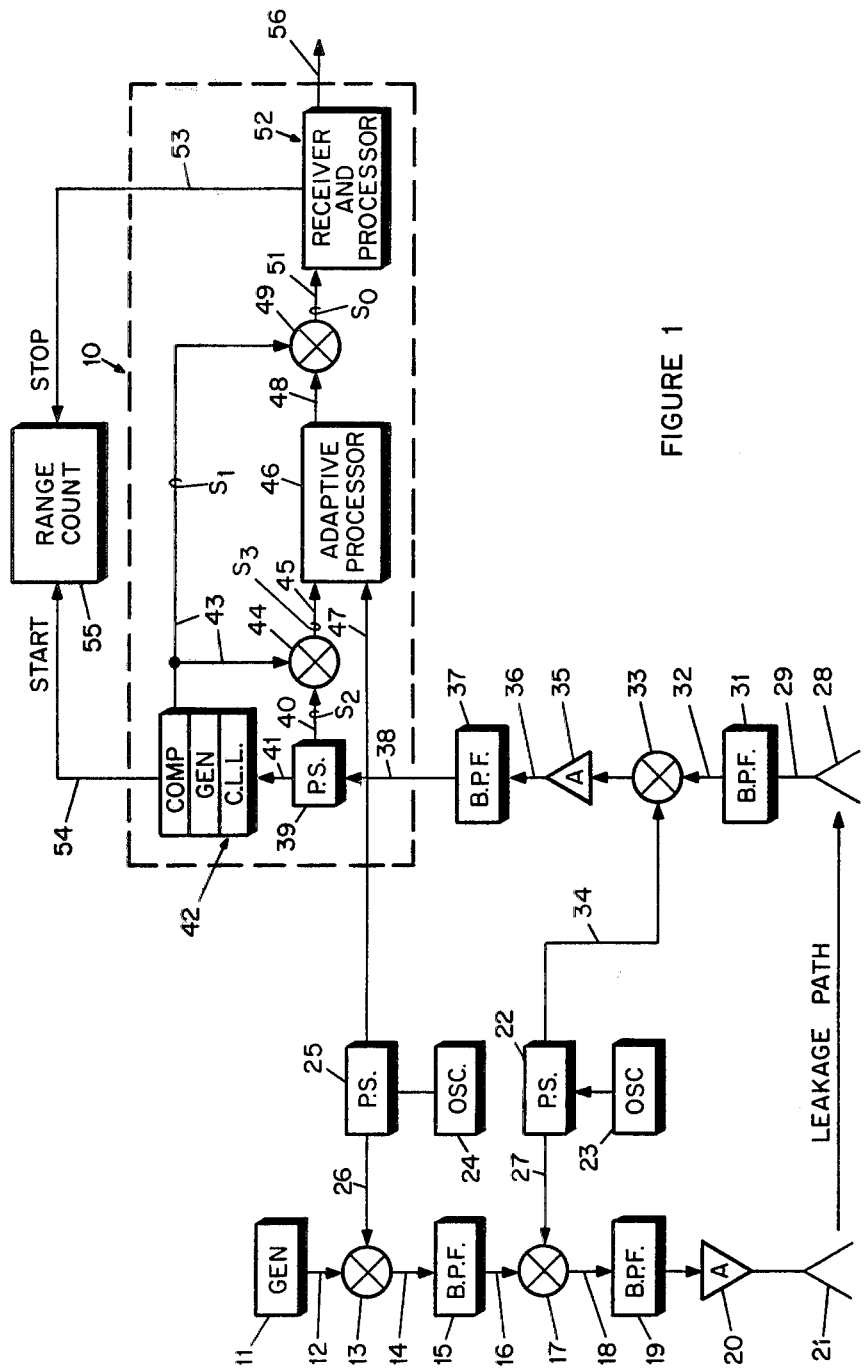
FIG. 1 is a schematic block diagram of the preferred embodiment of the present invention.

FIG. 1 shows in schematic block diagram form, the spread spectrum carrier wave apparatus of the type having a transmitter in close proximity to its receiver. The reference signal in the transmitting path is adapted to be transmitted as will occur in radar altimeters and also in communication systems and jam and monitor systems. All three of the aforementioned spread spectrum carrier wave systems can be illustrated in the single embodiment of FIG. 1 which employs the basic system 10. As will be explained in greater detail, hereinafter, the radar altimeter preferred embodiment illustration also employs some form of ranging apparatus.

In all three types of systems, the reference signal being transmitted also appears as a leakage signal in the receiving path because the two paths are close enough to be electromagnetically coupled. When the leakage signal is stronger than the received signal, the undesired leakage signal masks the desired received signal making it impossible to distinguish the desired received signal.

Random code generator 11 may be one of several types of generators which produce signals with noise-like properties. Both linear and non linear pseudonoise generators and pseudonoise random code generators are names generally applied to such generators. For purposes of explaining the preferred embodiment radar altimeter, generator 11 is preferably a pseudonoise generator.

Generator 11 produces a plurality of unique noise-like signals on line 12 which are applied to one input of the first mixer 13. Oscillator 24 generates an intermediate frequency (I.F.) carrier signal which is applied to power splitter 25 and via line 26 to mixer 13. The output of mixer 13 on line 14 is the pseudonoise generated signal which has a multiplied or carrier frequency applied thereto. The undesired portion of the signal is removed in band pass filter 15 or an equivalent processing circuit device which removes unwanted noise and signals. The modulated clean processed signal on line 16 is applied to one input of the second mixer 17. A local oscillator 23, preferably in the microwave frequency gigahertz range, has an output signal which is applied via power splitter 22 and via line 27 to the second input of mixer 17. The output signal from mixer 17 on line 18 is up converted to the final carrier wave frequency and is applied to a band pass filter 18, or equivalent circuit, to remove the undesired components of the signal. The reference signal output from the band pass filter 19 is amplified and processed at amplifier 20 and transmitted from antenna 21 as the transmitted radar signal.

The transmitted signal from antenna 21 is a microwave carrier frequency signal consisting of the frequencies of the oscillator 23 added to the frequency of oscillator 24. In the present illustrated example of a radar altimeter, the transmitted signal is bounced off of the earth or a desired target and is received as a reflected signal at antenna 28. As will be explained hereinafter, there is electromagnetic radiation shown as a leakage path which couples between antenna 21 and 28. Other forms of coupling between the transmitting path and the receiving path can occur.

The reflected signal which is received at antenna 28 is an attenuated and delayed replica of the signal which was transmitted from antenna 21. In the case of a radar altimeter, there is a very strong leakage path from antenna 21 to antenna 28. There are also other leakage paths when the transmitting path is in close proximity to the receiving path which may be more important in other types of systems.

The receive signal on line 29 contains leakage signals, desired received signals and undesired received signals. The undesired received signals such as noise, etc., are removed in band pass filter 31 or an equivalent circuit. The resulting signals on line 32 are applied to one input of mixer 33, which has a second input at line 34 from power splitter 22 and local oscillator 23. The microwave frequency local oscillator 23 provides means for down converting the received desired signal and the leakage signal to an intermediate frequency (I.F.). The down converted signals from mixer 33 are processed in amplifier 35 and applied via line 36 to filter 37 to remove any of the undesired components and noise introduced by amplification. The clean processed signals on line 38 are applied to power splitter 39 which also serves an impedance matching function. The clean processed I.F. signals are applied via line 41 to code lock loop means 42. In the preferred embodiment radar altimeter, the code lock loop means 42 also includes a pseudonoise generator and a comparator. The pseudonoise generator is preferably similar to generator 11 and tracks and locks on to the random code signal of the leakage signal. Code lock loop means 42 further comprises the comparator means for detecting a predetermined one of the random code signals produced by generator 11. When the predetermined unique random code signal is present at code lock loop means 42, an epoch or start signal is produced on line 54 which is adapted to start range counter 55.

The signal output on line 43 from code lock loop means 42 is a continuous signal and may be represented by the pseudonoise reference code $S_1 = (\pm 1)_t$. The signal output on line 40 is the same input signal present on line 41 to the code lock loop 42 and may be represented by $S_2 = K(\pm 1)_t$ cosine $(\omega_c t) + M(\pm 1)_{t+\tau}$ cosine $[\omega_c(t+\tau)]$ where the carrier frequency $\omega_c$ is typically in the range of hundreds of megahertz. When the signal $S_1$ on line 43 is combined with the signal $S_2$ on line 40 in multiplier-mixer 44, the signal $S_3$ on line 44 is produced which is equal to $S_1$ times $S_2$ or $S_3 = K(\pm 1)_t(\pm 1)_t$ cosine $(\omega_c t) + M(\pm 1)_t(\pm 1)_{t+\tau}$ cosine $[\omega_c(t+\tau)]$. The first portion of the $S_3$ signal is the undesired leakage signal and the latter portion of the $S_3$ signal after the constant M contains the desired delayed and attenuated signal. The $S_3$ signal simplifies because $(\pm 1)_{t'}(\pm 1)_t$ by definition reduces to unity. The simplified $S_3$ signal on line 45 is applied to the adaptive processor 46. The second input to adaptive processor 46 is the signal $S_4$ on line 47 where $S_4$ is equal to L cosine $(\omega_c t + \phi)$. The constants K, L and M are analog voltage values, t is the time base, $\omega_c$ is the carrier frequency, $\tau$ is the time difference between the desired and undesired signals and $\phi$ is the phase of the cosine signal.

Adaptive processor systems are well known and have been described in text books. Typical optical systems are described in U.S. Pat. No. 3,881,177 and also in my copending application Ser. No. 184,741 filed Sept. 8, 1980 for a Phase Weighted Adaptive Processor. The second signal path or receiving path, at lines 38, 40 and 41, contain both the desired and undesired signals. The code lock loop 42 tracks the undesired leakage signal, which is basically the same as the signal being produced by generator 11, and produces a replica of the undesired signal on line 43 which permits the undesired signal to be cancelled by the adaptive signal nulling in adaptive processor 46.

The output on line 48 from adaptive processor 46 is equal to $M(\pm 1)_t(\pm 1)_{t+\tau}$ cosine $[\omega_c(t+\tau)]$ after removal of the undesired signal. This signal is applied to one input of the second multiplier-mixer 49 and the other input to the multiplier-mixer from line 43 presents the replica signal or pseudonoise reference code signal $S_1 = (\pm 1)_t$. The output of multiplier-mixer 49 on line 51 is the desired attenuated and delayed receive signal output $S_0 = M(\pm 1)_{t+\tau}$ cosine $[\omega_c(t+\tau)]$. It will be understood that the recovery of the desired output signal $S_0$ on line 51 may be processed in receiver and processor 52 in several different ways to produce a desired output signal on line 56. In the preferred embodiment explanation of a radar altimeter the desired attenuated and delayed signal is processed in a code lock loop means similar to code lock loop means 42. The receiver and processor 52 would thus comprise a pseudonoise generator similar to generator 11, but in the present example, the generator would be adapted to scan and track the incoming signal on line 51 which is delayed relative to the signal on line 12 and line 41 which produce the start epoch signal on line 54. The same unique epoch signal is employed to produce a stop signal on line 53 which is adapted to stop the range counter 55.

It will be understood that code lock loop 42 is tracking the signal produced by generator 11 or the leakage signal being presented on line 41 while the code lock loop in receiver and processor 52 is tracking the desired signal which has been transmitted via antenna 21 and received at antenna 28 and is now delayed. Thus, the generator in receiver and processor 52 will contain a generator similar to generator 11 which tracks the signal being presented on line 51. The purpose for employing the leakage signal on line 41 to produce the start epoch signal on line 54 is intended to provided greater accuracy in measuring a range count which is equal to the time required for the transmitted signal to leave transmitter 21 and be sensed as a reflected receive signal at antenna 28. Systems in which the strong leakage signal is produced by electromagnetic coupling between the transmitting path and the receiving path may obtain the reference signal or a leakage signal to be applied to code lock loop from other appropriate points of the transmitting paths rather than tracking generator 11.

Code lock loop means 42 and/or the code lock loop in receiver and processor 52 have been described as comprising a pseudonoise generator employed to track the leakage signal and/or desired signal to produce an epoch signal employed to start and/or stop the range counter 55. Such systems are known and described as ranging systems. An example of an advanced technology ranging system is found in copending U.S. patent application Ser. No. 180,737 for a Non Coherent Two-Way Ranging Apparatus filed Aug. 25, 1980 by B. M. Spencer. The code lock loop may be a tau dither loop or a delayed lock loop. The tau dither loop is preferred. Having explained a preferred embodiment radar altimeter employing the present invention, it will be understood that those skilled in the art may now employ the present invention in jam and monitoring systems as well as other spread spectrum carrier wave systems where there is a strong undesired leakage signal, which is stronger than the desired receive signal, which tends to mask the desired receive signal.

I claim:

1. A spread spectrum carrier wave apparatus of the type having a transmitter in close proximity to its receiver, which couples undesirable leakage signals from the transmitter into the receiver path with the desired received signals, the combination comprising:

a random code generator for generating a plurality of carrier frequency random code modulated signals, a first processing path for processing said signals from said generator to provide random code generated modulated signals, a transmitting antenna for transmitting the processed random code generated modulated signals, a receiving antenna for receiving desired delayed and attenuated replicas of said transmitted processed random code generated modulated signals, a second processing path for processing said desired delayed and attenuated replicas of said random code generated modulated signals, said second processing path being electromagnetically coupled to said first processing path and containing an undesired leakage signal which is a weakened version of said processed random code modulated signals, first code lock loop means connected to said second processing path for generating a tracking signal locked on to said undesired random code modulated signals for generating an output reference signal in phase with said random code, a first multiplier-mixer coupled to said output reference signal and to said second processing path containing said desired and said undesired random code signals, an adaptive processor coupled to the output of said first multiplier-mixer and said first signal path for eliminating said undesired random code signal, and a second multiplier-mixer coupled to the output of said adaptive processor for eliminating said output reference signal, thereby leaving said desired delayed and attenuated carrier frequency random code modulated signals.

2. A spread spectrum carrier wave apparatus as set forth in claim 1, wherein, said second processing path comprises a power splitter having an output connected to said first code lock loop means.

3. A spread spectrum carrier wave apparatus as set forth in claim 2, which further includes receiver and processor means coupled to the output of said second multiplier-mixer, for detecting a unique random code modulated signal of said plurality of carrier frequency random code modulated signals.

4. A spread spectrum carrier wave apparatus as set forth in claim 2, which further includes receiver and processor means comprising second code lock loop means coupled to the output of said second multiplier-mixer, said first and said second code lock loop means each further comprising a first and second random code generator and first and second means for detecting a unique carrier frequency random code modulated signal, and a range counter coupled to the output of said first and said second means for detecting a unique carrier frequency random code modulated signal, whereby, said range counter is started by said first means for detecting and stopped by said second means for detecting, thereby, providing a range count.

5. A spread spectrum carrier wave apparatus as set forth in claim 4, wherein, said first code lock loop means comprises a tau dither loop.

6. A spread spectrum carrier wave apparatus as set forth in claim 4, wherein, said random code generator produces a non-linear pseudo random code.

7. A spread spectrum carrier wave apparatus as set forth in claim 6, wherein, said first processing path includes first mixer means, and first oscillator means coupled to said first mixer means for applying an intermediate frequency carrier modulation signal to said random code generator output signals.

8. A spread spectrum carrier wave apparatus as set forth in claim 7, wherein, said first processing path includes second mixer means, and second oscillator means coupled to said mixer means for applying a microwave frequency carrier signal to said modulated random code generated output signals for producing said spread spectrum carrier wave signals to be transmitted.

* * * * *